United States Patent [19]

Sacomani et al.

[11] 4,010,736
[45] Mar. 8, 1977

[54] FOOD WARMER AND HUMIDIFIER

[76] Inventors: Norma Rose Sacomani; Louis Paul Sacomani, both of 1426 San Lucas Court, Solana Beach, Calif. 92075

[22] Filed: Dec. 8, 1975

[21] Appl. No.: 638,700

[52] U.S. Cl. .................................. 126/369; 220/13
[51] Int. Cl.² ........................................ F24D 1/00
[58] Field of Search ............ 126/369, 369.1, 369.2, 126/369.3, 376, 377, 378, 379; 220/13, 68

[56] References Cited
UNITED STATES PATENTS

| 170,921 | 12/1875 | Viehmeyer | 126/369 |
|---|---|---|---|
| 252,884 | 1/1882 | Linney | 126/369.3 |
| 3,141,455 | 7/1964 | Dumbeck | 126/369 |
| 3,641,992 | 2/1972 | Peyser et al. | 126/378 |
| 3,659,584 | 5/1972 | Doyle et al. | 126/369 |

*Primary Examiner*—Edward G. Favors
*Attorney, Agent, or Firm*—Brown & Martin

[57] ABSTRACT

A food warmer and humidifier comprising a double walled container forming a water jacket in which water is heated. The water jacket has a primary vent which may have a variable orifice to vent the major portion of the steam and water vapor generated. A small orifice or steam port opens from the water jacket into the inner chamber in which the food is placed, to admit a controlled amount of steam for warming and humidifying the food. A lid with controllable vents releases excess steam to prevent internal condensation. In one form the position of the steam port can be varied relative to the primary vent to control the pressure ratio and thus the amount of steam admitted to the inner chamber.

9 Claims, 10 Drawing Figures

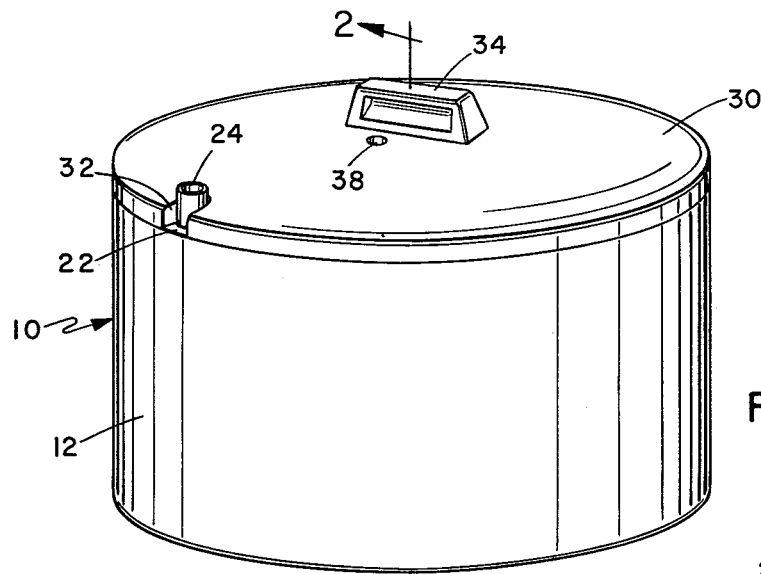
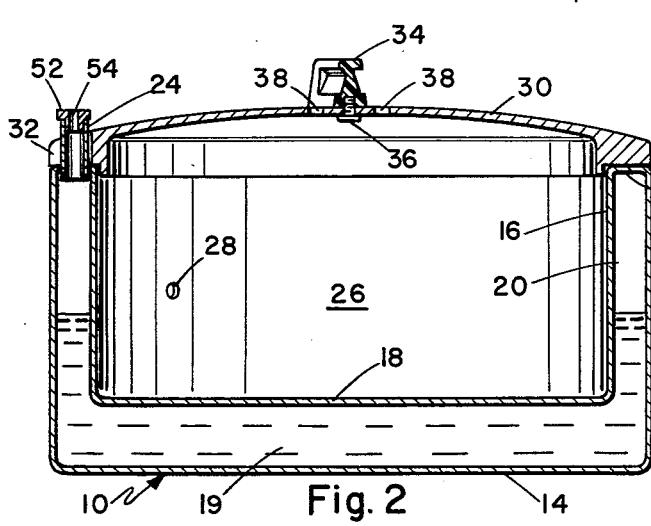
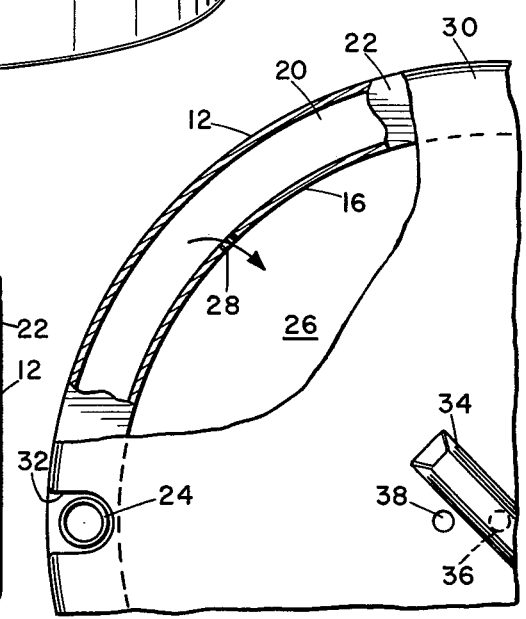
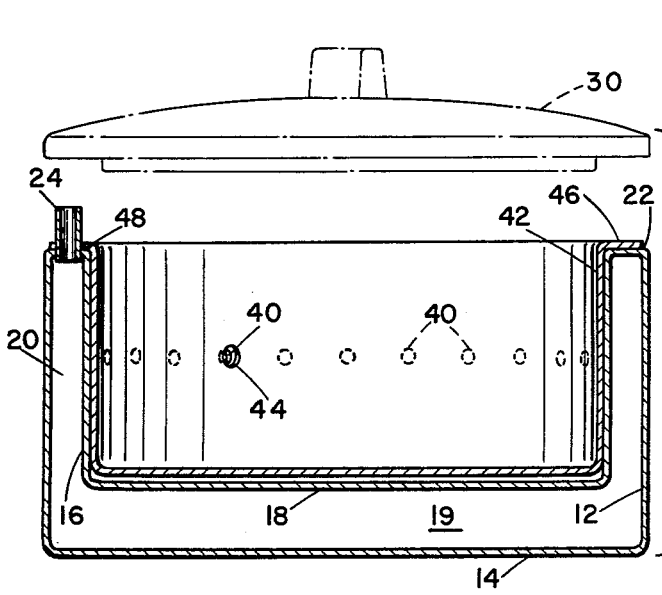
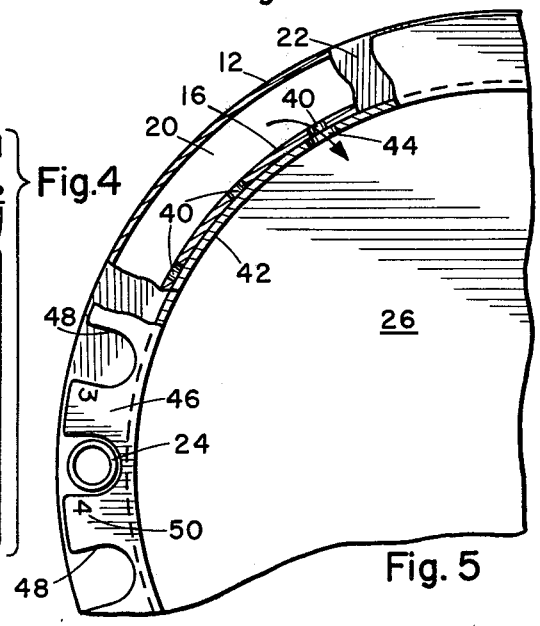

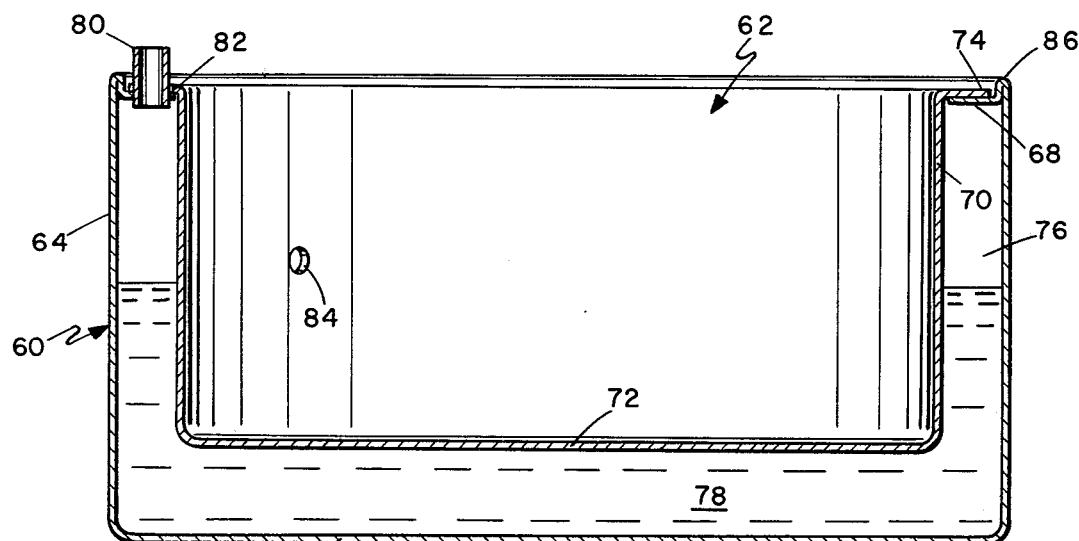
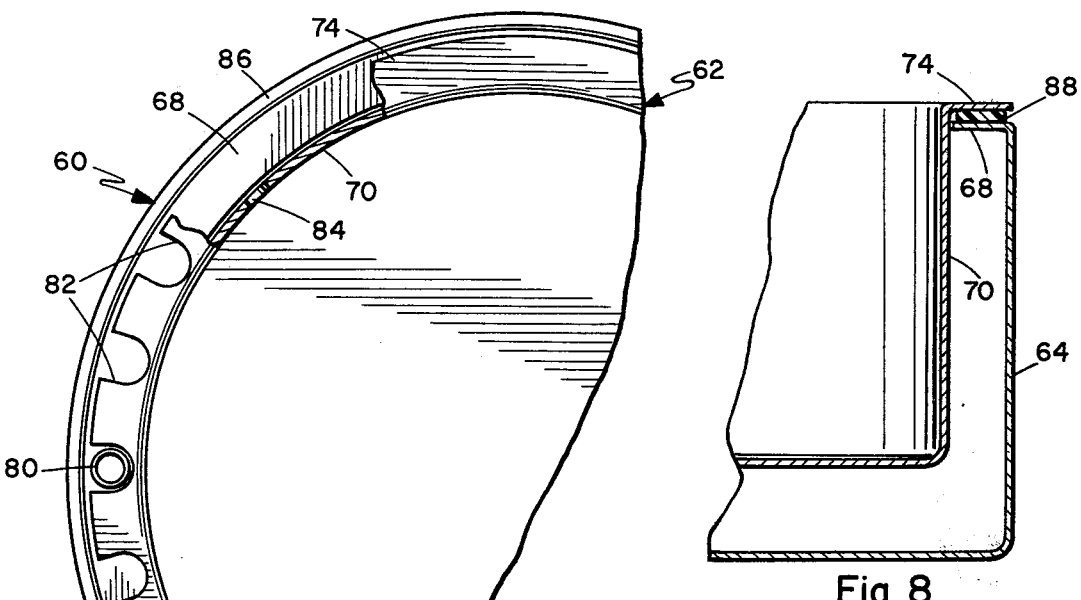
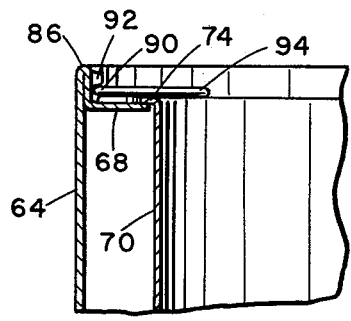
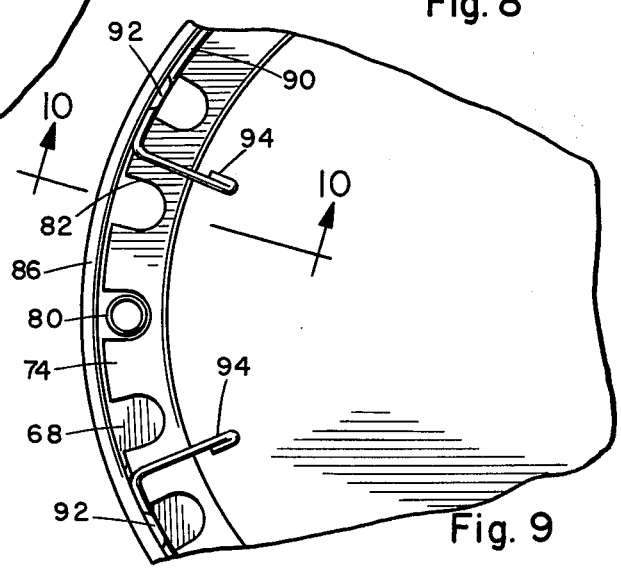

FOOD WARMER AND HUMIDIFIER

BACKGROUND OF THE INVENTION

Many types of double boilers, steamers, pressure cookers and the like have been developed for warming a complete cooking of a variety of foods. In the low pressure types, such as double boilers or pans with non-sealed lids, steam accumulates under the lid and saturates the food. In addition, excess steam condenses on the underside of the lid and drips onto the food. As a result the food becomes soggy and may even tend to disintegrate. For some types of foods the excess humidity is undesirable, which limits the use of the equipment.

In warming or keeping warm such foods as cakes, rolls, bread, tortillas and the like, dry heat is sometimes used. Prolonged dry heat can dry out the food, but excess moisture is equally undesirable. Vegetables and fruits can tolerate more moisture, but an excess is still not desirable. A limited amount of humidity is effective in warming puddings and other hot desserts, to avoid formation of a crust which occurs in drying out. Meats and particularly fish require more steam, but still not an excess as produced in utensils now in use.

It would, therefore, be a great advantage to be able to warm food with a closely controlled degree of humidity, suited to the specific food, but without complex control or metering devices.

SUMMARY OF THE INVENTION

The utensil described herein is a doubled walled container forming a water jacket in which water can be heated. A major portion of the steam generated is released through a primary vent to relieve pressure, the vent being easily made variable for pressure control. A steam port opens from the water jacket, above the water line, to allow steam to enter the inner chamber in which the food is placed. The size of the port determines the amount of steam entering the inner chamber, and the circumferential spacing of the port from the primary vent also controls the steam flow.

Since the primary vent restricts the steam venting to a certain degree, a limited pressure will build up in the water jacket. In a cylindrical jacket of narrow cross section there is a pressure gradient increasing from the primary vent to the diametrically opposite side. Thus the greater the spacing of the port from the primary vent, the higher the effective pressure at the port, so the steam flow is controlled by both port size and location.

The container has a lid with vents which are controlled by a rotatable handle, to vent excess steam from the inner chamber and avoid internal condensation. The primary vent projects upwardly from the rim of the container and the lid is notched to clear the vent.

In the simple form the inner chamber wall has a single steam port which is positioned to suit the primary intended use of the utensil, the steam input, being in a specific range. In another form the inner wall has several circumferentially spaced ports which can be opened selectively. This is accomplished by using a liner which is rotatable in the inner chamber and has a single opening to register with each port individually. The liner has a flange which rests on the rim of the container and is notched to clear the primary vent at spacings corresponding to the spacing of the ports. The notches are thus used to index the liner on the primary vent to open a selected port for the desired steam input. In another form, the inner wall itself is rotatable in the container and has a single port which can be indexed to various positions by the notched flange arrangement.

The primary object of this invention, therefore, is to provide a new and improved food warmer and humidifier.

Another object of this invention is to provide a food warmer and humidifier in which steam input to the food container is closely controlled.

Another object of this invention is to provide a food warmer and humidifier having a self-contained water jacket in which the steam is generated.

A further object of this invention is to provide a food warmer and humidifier in which the steam input is variable to suit different foods.

Other objects and advantages will be apparent in the following detailed description, taken in conjunction with the accompanying drawings, in which:

FIG. 1 is a perspective view of the utensil.

FIG. 2 is a sectional view taken on line 2—2 of FIG. 1.

FIG. 3 is an enlarged top plan view, partially cut away, of a portion of the utensil.

FIG. 4 is a sectional view, similar to FIG. 2, but with multiple steam ports and a movable liner.

FIG. 5 is a top plan view, partially cut away, of the structure of FIG. 4.

FIG. 6 is a sectional view similar to FIG. 2, but showing a rotatable inner container.

FIG. 7 is a top plan view, partially cut away, of a portion of FIG. 6.

FIG. 8 is a sectional view similar to a portion of FIG. 6, showing magnetic retention of the inner container.

FIG. 9 is a similar sectional view showing snap ring retention of the inner container.

FIG. 10 is a top plan view of the structure of FIG. 9.

DESCRIPTION OF THE PREFERRED EMBODIMENT

The basic form of the utensil illustrated in FIGS. 1–3, comprises a double walled container 10, preferably of cylindrical configuration but not necessarily limited to a circular structure. The container has an outer wall 12 and bottom panel 14, and an inner wall 16 with a bottom panel 18 spaced above bottom panel 14 to provide a water reservoir 19. Walls 12 and 16 are concentric and spaced to provide an annular water jacket 20, extending upwardly from reservoir 19 the upper edges of the walls being joined to form a rim 22. A primary vent 24 in the form of a short tube projects upwardly through rim 22 to vent the jacket 20.

Steam is admitted to the inner chamber 26 of the container through a port 28 in the inner wall 16. The port is approximately centered in the depth of the inner wall and is circumferentially spaced from the primary vent 24. As illustrated in FIG. 3, the port 28 is offset about 45 degrees from the primary vent, but can vary to control the amount of steam entering chamber 26. Due to the pressure gradient in the jacket 20, the highest pressure occurs diametrically opposite the primary vent. Thus by locating the port 28 closer to the primary vent, steam flow into chamber 26 is reduced, while by moving the port further around the inner wall, the steam flow is increased.

The container is covered by a lid 30 which rests on rim 22 and has a notch 32 to fit around primary vent 24. Lid 30 is domed at the center and is provided with a handle 34 secured by a screw 36, or similar means, the handle being rotatable by reasonable manual effort. In the central portion of the lid are vent openings 38 which can be uncovered or covered to any desired degree by rotating handle 34. The vent openings 38 allow excess steam to be vented before condensation builds up on the underside of the lid and the water drips on the food. The water jacket and reservoir are filled through primary vent 24 to a level just below port 28. This is easily accomplished by tilting the container with the port on the low side and filling until water starts to flow out of the port.

To make the utensil adaptable to a wide range of foods, the arrangement illustrated in FIGS. 4 and 5 may be used. The basic container 10 is unchanged except for the steam port in the inner wall. Instead of a single port there are multiple ports 40 circumferentially spaced horizontally around inner wall 16. The port opening is controlled by an inner liner 42 which fits closely into and is rotatable in chamber 26, the liner having a single control port 44 which can register with each port 40 individually.

To index the ports correctly, liner 42 has a flange 46 which rests on rim 22, the flange having notches 48 to fit around primary vent 24. Notches 48 are circumferentially spaced to correspond to the spacing of ports 40 and thus act as indexing means on the vent 24 to position liner 42. Suitable indicia 50 may be applied to flange 46 adjacent the notches 48 to identify the specific port 40 which is open. A reference table can then be made up to show which port should be open for proper humidifying of certain foods.

In a further configuration, illustrated in FIGS. 6 and 7, the container is in two parts, an outer container 60 and an inner container 62. Outer container 60 has an outer wall 64 and bottom panel 66, the upper edge of the wall having an inwardly turned rim 68. Inner container 62 has an inner wall 70 and bottom panel 72, the upper edge of the inner wall having an outwardly turned flange 74 which rests on rim 68. The configuration is similar to that of container 10 and encloses an annular jacket 76 and lower reservoir 78. A primary vent 80 extends upwardly from rim 68 and flange 74 has notches 82 to index on the vent.

Inner wall 70 has a single steam port 84, the position of which can be changed relative to primary vent 80 by rotating the inner container 62 to the desired indexed position. This arrangement eliminates the separate inner liner of FIG. 4.

As illustrated, the rim 68 is recessed below a peripheral upper bead 86, which minimizes leakage under flange 74. At low pressures the weight of lid 30 will be sufficient to hold the inner container in place, since the open primary vent 80 prevents excessive build up of pressure.

For higher pressures, as with vent 80 restricted, it may be desirable to hold the inner container in place. One suitable arrangement, shown in FIG. 8, utilizes a peripheral seal 88 attached to either the rim 68 or flange 74, the seal being of the magnetic plastic material as used on refrigerator doors and the like. Rim 68 could be recessed if necessary, as in FIG. 6.

An alternative retention arrangement is shown in FIGS. 9 and 10, in which the inner container is held in place by a wire snap ring 90. Rim 68 is recessed below a peripheral bead 86, as in FIG. 6, the bead having inwardly projecting ribs 92 under which the snap ring 90 is engaged. The snap ring is split and is provided with fingers 94 at the ends to facilitate release by squeezing the fingers together. The inner container can then be indexed to the required port position and the snap ring replaced.

It should be noted that the retention means shown are representative and that other arrangements may be used, depending on the size and structure of the container.

If additional stream pressure is required for any purpose, a restrictor 52 with an orifice 54 may be inserted in primary vent 24, as in FIG. 2. Alternatively, weighted caps may be used as on a pressure cooker, the principle being well known.

The utensil is a very simple and versatile device, which can be used to warm a variety of foods. Any suitable source of heat can be used, such as a stove or hot plate. Or the container can be supported on a stand over a spirit lamp or candle. The food is heated by conduction and radiation from the inner container surfaces, which are heated by the hot water. The steam also provides considerable heating as well as humidifying the food. Once the water is heated, the utensil may be set on a table without a source of heat, the residual heat in the water being sufficient to keep the contents warm during a normal meal.

For bread and cake products only a small amount of humidity is necessary to prevent drying out. A steam port near the primary vent is used for minimum steam flow and lid vents 38 can be open.

By using a port well spaced from the primary vent for maximum steam flow and closing, or nearly closing the lid vents, the utensil is capable of steaming fish. Primary vent 24 can also be restricted to increase steam pressure in the jacket and add to the cooking capability.

Having described our invention, we now claim:

1. A food warmer and humidifier comprising:
   a double walled container with an outer wall and an inner wall enclosing a water jacket, and having an inner food holding chamber;
   said container having an upper peripheral rim at which said outer and inner walls are connected;
   said container having a closed bottom portion and said chamber having a closed bottom panel spaced from said closed bottom portion;
   said water jacket having a primary vent extending through said rim;
   at least one steam port in said inner wall communicating from said water jacket into said chamber, said port being circumferentially spaced from said primary vent at a distance related to a predetermined steam flow through the port;
   and a lid adapted to seat on said rim.

2. A food warmer and humidifier according to claim 1, wherein:
   said container includes an inner container and an outer container;
   said inner container comprising said inner wall and closed bottom panel, said inner wall having an outwardly projecting upper peripheral flange resting on said outer wall at said rim;
   and said inner container being rotatable in said outer container for moving said steam port relative to said primary vent.

3. A food warmer and humidifier according to claim 1, wherein said inner wall has a plurality of circumferentially spaced steam ports therein, equally spaced above said bottom panel, and including a liner fitting closely and being rotatable in said inner chamber, said liner having a control port therein for selective registration with said steam ports.

4. A food warmer and humidifier according to claim 3, wherein said primary vent is a tubular element projecting upwardly from said rim, said liner having a flange resting on said rim, said flange having notches to fit around the primary vent and the notches being circumferentially spaced corresponding to the spacing of said steam ports for indexing the liner to selective steam ports.

5. A food warmer according to claim 4, wherein said flange has identifying indicia thereon adjacent the respective notches.

6. A food warmer according to claim 1, wherein said chamber has a plurality of circumferentially spaced steam ports from said water jacket, and means for selectively opening individual steam ports.

7. A food warmer and humidifier according to claim 2, and including retention means comprising a magnetic seal between said rim and said flange.

8. A food warmer and humidifier according to claim 2, wherein said outer wall has an upper peripheral bead, said rim being recessed below said bead;

and retention means comprising a snap ring engaging said bead immediately above said flange.

9. A food warmer and humidifier according to claim 2, wherein said primary vent is a tubular element projecting upwardly from said rim;

said flange having circumferentially spaced notches to fit around said primary vent and provide indexing means for positioning said inner container and the steam port therein to selected positions relative to the primary vent.

* * * * *